(12) United States Patent
Seibel et al.

(10) Patent No.: US 12,242,891 B2
(45) Date of Patent: Mar. 4, 2025

(54) EDGE FUNCTION BURSTING

(71) Applicant: EMC IP Holding Company LLC, Hopkinton, MA (US)

(72) Inventors: Amy N. Seibel, Newton, MA (US); Victor Fong, Medford, MA (US); Eric Bruno, Shirley, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 200 days.

(21) Appl. No.: 17/383,257

(22) Filed: Jul. 22, 2021

(65) Prior Publication Data
US 2023/0025530 A1  Jan. 26, 2023

(51) Int. Cl.
*G06F 9/50* (2006.01)
*G06F 9/48* (2006.01)
*H04L 47/70* (2022.01)

(52) U.S. Cl.
CPC .............. *G06F 9/5005* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4881* (2013.01); *G06F 9/50* (2013.01); *G06F 9/5027* (2013.01); *G06F 9/505* (2013.01); *G06F 9/5061* (2013.01); *G06F 9/5077* (2013.01); *G06F 9/5083* (2013.01); *H04L 47/82* (2013.01)

(58) Field of Classification Search
CPC ........ G06F 9/48; G06F 9/4806; G06F 9/4843; G06F 9/485; G06F 9/4856; G06F 9/4881; G06F 9/50; G06F 9/5005; G06F 9/5027; G06F 9/505; G06F 9/5061; G06F 9/5077; G06F 9/5083
See application file for complete search history.

(56) References Cited

U.S. PATENT DOCUMENTS

| | | | |
|---|---|---|---|
| 2015/0331635 A1* | 11/2015 | Ben-Shaul | G06F 3/067 711/120 |
| 2017/0181027 A1* | 6/2017 | Raleigh | H04W 24/02 |
| 2018/0150325 A1* | 5/2018 | Kuo | G06F 9/4843 |
| 2019/0050258 A1* | 2/2019 | Kim | G06F 9/5011 |
| 2020/0142735 A1* | 5/2020 | Maciocco | H04L 63/1408 |
| 2020/0192714 A1* | 6/2020 | Clow | G06F 9/5011 |
| 2020/0320397 A1* | 10/2020 | Liu | H04L 67/148 |
| 2020/0322233 A1* | 10/2020 | Gao | H04L 41/5054 |
| 2021/0307018 A1* | 9/2021 | Qaisrani | H04W 48/18 |

* cited by examiner

Primary Examiner — Charles M Swift
(74) Attorney, Agent, or Firm — Workman Nydegger

(57) ABSTRACT

One example method includes determining that local resources at an edge site are inadequate to support performance of a function needed by software running on the edge site, invoking a client agent, in response to invoking the client agent, receiving an execution manifest, determining, by the client agent, where to execute the function, wherein the determining comprises identifying a target execution environment for the function and the determining is based in part on information contained in the execution manifest, and transmitting, by the client agent, the execution manifest to a server agent of the target execution environment, and the execution manifest facilitates execution of the function in the target execution environment.

18 Claims, 6 Drawing Sheets

EDGE FUNCTION BURSTING

FIELD OF THE INVENTION

Embodiments of the present invention generally relate to edge computing. More particularly, at least some embodiments of the invention relate to systems, hardware, software, computer-readable media, and methods for function burst out to take advantage of resources when local resources to perform a function may be inadequate.

BACKGROUND

While edge computing has proven useful, problems remain in conventional approaches, particularly with respect to the use and availability of computing resources. For example, while each edge-station and user equipment may be independent entities, or independent clusters, the edge-station and user equipment may be unaware of the existence of other potential resources that they can utilize. This problem is further complicated by the fact that there are many service vendors from both public and private domains. Each service vendor may also have heterogeneous settings for both hardware and software. With current technology, it is difficult to determine what are the current choices available.

Another problem with conventional approaches is that dynamic, real-time, decision making is a challenge. In particular, it may be difficult for a user to locate resources needed for performance of a function because, in a real-world scenario, the type and availability of resources would likely be dynamic, as resource consumption and latency, for example, would change over time. Furthermore, each function may have a different execution requirement, from both user expectations, that is, an expected user experience, and from a technical perspective, that is, software and hardware requirements to support the function. A related problem concerning real-time decision-making process is that since functions are short-lived by nature and execute extremely quickly, often less than 1 second, humans are simply unable to make decisions quickly enough to support applications and function execution requirements. Moreover, a human is unable to timely make the number of decisions that are needed in real world environments.

A final example of a problem with conventional approaches concerns function deployment and orchestration. In particular, typical FaaS (Function as a Service) execution models are based on trigger, meaning that each cluster responsible for function execution is actively waiting for a trigger to perform a specific function. This execution model implies that each cluster needs to be aware of the function that it is responsible for. Given this nature, it is difficult for all software vendors to deploy all of their functions to all edge-FaaS providers and all cloud-FaaS providers.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
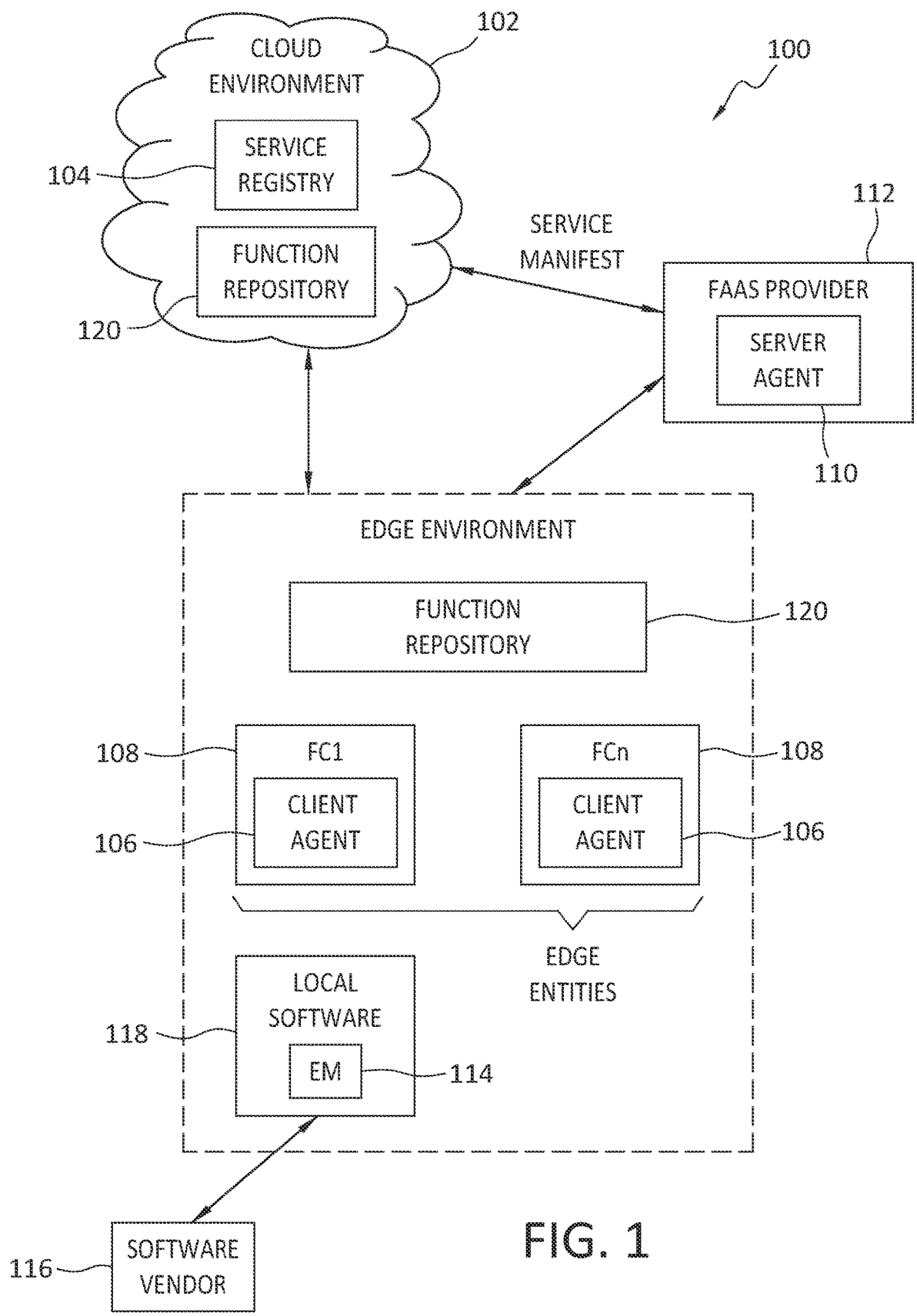
FIG. 1 discloses aspects of an example architecture according to some embodiments.

Embodiments of the present invention generally relate to edge computing. More particularly, at least some embodiments of the invention relate to systems, hardware, software, computer-readable media, and methods for function burst out to take advantage of resources when local resources to perform a function may be inadequate.

In general, example embodiments of the invention embrace, among other things, a function bursting mechanism operable in edge computing environments that may be used on user-equipment and edge stations. By making use of a topology category and registration mechanism, the function caller may quickly determine where to best place functions, orchestrate, and invoke, them to obtain the output of the function. Based on the automatically, or manually, defined policy defined by a function caller, the function caller may, in bursting out a function, strike a balance between cost, performance and other factors. Embodiments may be employed not only in edge infrastructures but also in as-a-Service (aaS) offerings. Embodiments may provide bursting capabilities for user equipment such as desktops and laptops, as well as infrastructure, such as the DellEMC VxRail platform for example.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that such embodiments may implement function level edge bursting which may enable more efficient resource use, and finer-grained control of resource use, than if, for example, function bursting were performed at a container level, or application level. An embodiment may employ automated deployment and placement-decision-making by the function caller, reducing complexity for software vendors, and allowing function callers to adjust cost and performance requirements based on their own policies. Various other advantages of example embodiments will be apparent from this disclosure.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which functions are short-lived by nature and execute extremely quickly, often less than 1 second. As such, humans are simply unable to make decisions quickly enough to support applications and function execution requirements. Moreover, a human is unable to timely make the number of function burst decisions that are needed in real world environments. Accordingly, nothing herein should be construed as teaching or suggesting that any aspect of any embodiment of the invention could or would be performed, practically or otherwise, in the mind of a human.

A. Overview

The following is a discussion of aspects of example operating environments, and related considerations, for various embodiments of the invention. This discussion is not intended to limit the scope of the invention, or the applicability of the embodiments, in any way.

In general, a Function-as-a-Service (FaaS) may comprise one or more functions provided to service the needs of a user, such as an application for example. Functions are ephemeral workloads that are designed to start, execute and end in a short amount of time, typically within one second. Some Function-as-a-Service (FaaS) approaches may execute these functions dynamically at runtime. These services may be executed in a container runtime environment, though other runtime environments may also be feasible depending on the nature of the use case. A pricing model for performance of these functions may be calculated in terms of seconds or minutes, rather than hours, as may be the case for container and VM (Virtual Machine) execution services.

In example embodiments, each user equipment and edge-station may have their own respective execution environment, limited by their own resource capacity. When each environment needs additional resources, such as processing, memory, and/or, storage for example, bursting capability empowers these environments to leverage additional resource from surrounding equipment or from a cloud environment which may be public, or private.

Some public service providers offer FaaS at an edge environment, such as AWS Lambda Edge for example. Telco or private edge institutions may also provide additional FaaS-offerings in addition to their edge stack. Typically, the FaaS frameworks provide value by executing functions on top of Container-as-a-Service (CaaS) type environments, such as Kubernetes for example.

With the foregoing in view, example embodiments may involve the creation, implementation, and use of a variety of different entities, or personas. One of these personas may take the form of Edge-FaaS providers. In general, edge-FaaS providers may offer Function-as-a-Service at the edge, that is, in an edge computing environment. Thus, the providers may provide edge-based execution environments that may be public, such as Telco companies for example, or private, such as schools for example.

Another entity or persona that may be employed in connection with some example embodiments is a cloud FaaS provider. Cloud-FaaS providers may offer Function-as-a-Service in a cloud computing environment. Typically, these cloud FaaS vendors provide public services offering execution environments in large datacenters. Sometimes, a cloud FaaS vendor may be the same entity as an Edge-FaaS providers, as in the case of Amazon AWS for example. In general, the cost to a customer of a cloud based FaaS is usually, though not always, lower than the cost to a customer of an edge based FaaS.

Software providers are another example of an entity that may be employed in connection with some example embodiments. Software providers may provide software that can be executed in user equipment, or edge or cloud execution environments. Depending on the use case, software providers also may provide input into the selection of an execution environment. For example, some software can only execute with GPU, or may require a specific FaaS implementation. Some software may support various types of execution environments.

Yet other entities or personas that may be employed in some embodiments are function callers. Function callers may burst out to services offered by example embodiments to burst to cloud FaaS or edge FaaS providers. The function calls may be originated from user equipment or other edge-stations. Since example embodiments may offer an automated mechanism to select and burst out to target execution environments, the human user is likely not involved in the dynamic decision-making process. The actual selection and orchestration may instead be executed by a machine, although a human user may be responsible for making policies that would guide the machine implemented decision-making and bursting process. In some instances, the function caller may also be an edge-FaaS provider such as when, for example, that provider runs out of resources at the local site, or the provider needs to execute a function that the provider cannot support, such as when the provider is reselling a service offered by another and cannot, itself, execute the service.

B. Aspects of Some Example Embodiments

Among other things, example embodiments may provide a mechanism for edge-stations and user equipment to dynamically burst the performance of one or more functions to surrounding edge-stations that offer Function-as-a-Service. The function bursting may occur when the local system, such as user equipment or an edge-station for example, does not have sufficient resource to execute a specific function, or if the function requires a different execution environment, where the execution environment may comprise hardware and/or software.

As shown in the example architecture 100 of FIG. 1, example embodiments may involve a variety of components. A cloud computing environment 102 may include a service registry 104. The service registry 104 may be run by a third party, although that is not necessarily required. An instance of a client agent 106 may be installed at each of 'n' function callers 108. Example function callers 108 may include, but are not limited to, user equipment, and edge stations. As well, an instance of a server agent 110 may be run at one or more FaaS providers 112, examples of which include cloud FaaS providers, and edge FaaS providers. An execution manifest 114 may be provided by a software vendor 116 to local software 118 which may be running in the edge environment on an edge device or user equipment. Finally, a function repository 120 may be provided at the cloud computing environment 102 and the edge environment. In general, the function repository 120 may enable software vendors 116 to register the functions that their software is capable of performing.

In terms of the operation of various components of the example architecture, each edge-FaaS and cloud-FaaS, collectively, FaaS providers 112, may execute the server agent 110 in their respective cluster. The client agent 106 may be installed at function-caller 108 sites that can burst out to utilize external resources. The server agent 110 and client agent 106 may be co-located, either at the FaaS provider 112 or the function caller 108. In some embodiments, the server agent 110 and client agent 106 may be implemented together as a single entity.

At start-up time, the server agent 110 from the FaaS providers 112 communicate with the service registry 104. The server agents 100 may submit a service manifest, highlighting the hardware and software resources available from the FaaS providers 112, as well as the pricing model for provision of those resources. After the initialization phase, the server agent 110 may periodically communicate with service registry 112 to describe available resources. Depending on the particular use case, the length of time between such periodic communications may be user configurable. The service registry 112 may maintain the non-real-time state of each edge-FaaS and cloud-FaaS provider, that is, the Faas providers 112. For example, an update may be sent from each FaaS provider to the service registry 112 every 5 minutes to apprise the service registry 112 of the hardware and software resources available from the FaaS providers 112.

When a client agent 106 starts up, the client agent 106 may reach out to the service registry 112 to determine which peers, that is, FaaS providers 112, are available. The service registry may reply to the client agents 106 with a peer-list that lists the FaaS providers 112 that are available. The client agent 106 may then reference the peer-list and reach out to each peer, that is, the FaaS providers 112, to determine their availability. When there is a need for a local software 118 to burst out, the local software 118 may reach out to the client agent 106 with the execution manifest 114 that corresponds to the function to be burst out. The client agent 106 may make the placement decision, that is, the decision where the function should be executed, by selecting the target execution environment based on, for example, the FaaS providers 112 that are available, and any applicable policies. The client agent 106 may then provide the execution manifest 114 to the server agent 110 of the FaaS provider 112. Note that the local software 118 may burst out, for example, by way of a plugin in KNative, although no particular mechanism is required. Based on the execution manifest, the server agent 110 may then pull the necessary executables, to perform the function that is burst out, from the function repository 120, and deploy the function in the FaaS provider 112 environment. The function will then execute. Any output of the function may be provided to the client agent 106 and/or local software 118.

Figure 2:
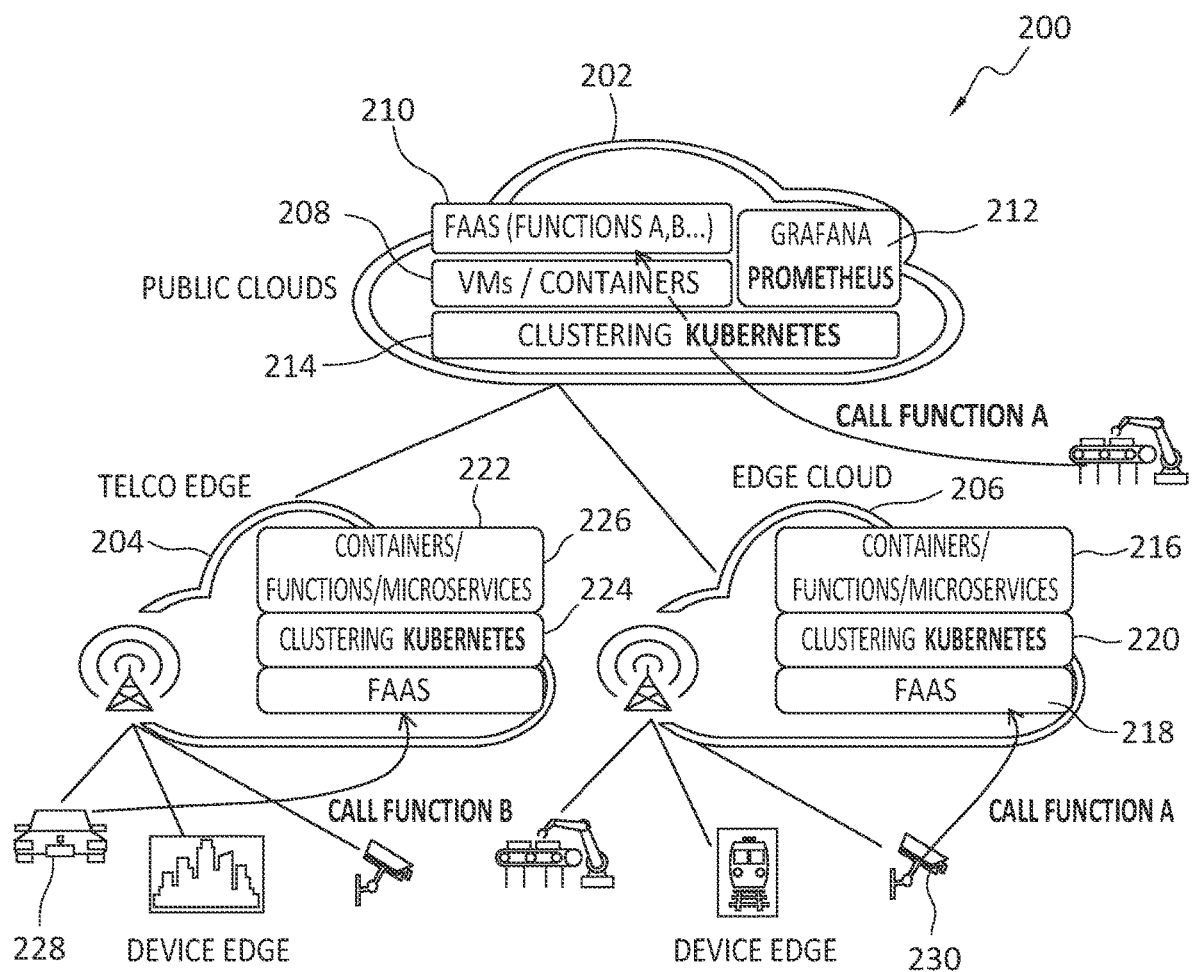
FIG. 2 discloses aspects of an example architecture and use case.

With reference next to FIG. 2, a configuration 200 is disclosed that includes a public cloud 202, a Telco edge site 204, and an edge cloud 206. As shown, the public cloud 202 may include various components. For example, the public cloud may include VMs (Virtual Machines) and containers 208 that are operable to perform one or more functions 210, where the functions 210 may be provided by way of an FaaS infrastructure. The public cloud 202 may also include or implement the Grafana/Prometheus platforms 212 which may enable the viewing (by Grafana) of time series metrics that have been gathered (by Prometheus). Finally, a cluster 214, such as Kubernetes cluster for example, may be provided that includes a set of node machines that are running, or able to run, containerized applications that include or imply one or more functions.

The edge cloud 206 may comprise a group 216 of one or more containers, functions, or microservices. Any of these containers, functions, and microservices, may be provided by an FaaS infrastructure 218. The edge cloud 206 may also implement these functions, containers, and microservices, by way of one or more node machines that collectively form a cluster 220, such as a Kubernetes cluster for example. The Telco edge 204 or other edge system/device/platform may be similarly configured as the edge cloud 206, although that is not required. As such, the Telco edge 204 may comprise a group 222 of containers, functions, and microservices, that may be implemented and provided by way of an FaaS infrastructure 224. Finally, the Telco edge 204 may implement a cluster 226.

In the example of FIG. 2, the Telco edge station 204 closest to the automotive-based edge device 228 may intercepts and handle the call from the edge device 228 to Function B in the FaaS infrastructure 224. Similarly, the edge cloud 206 closest to the smart camera edge device 230 may intercept the call from the edge device 230 to Function A, instead of Function A executing in the public cloud 202. In both cases, local edge-based FaaS execution may improve performance and reduce latency. For cases where edge infrastructure, such as the edge cloud 206 and the Telco edge 204, is not available, the called function may execute in the public cloud 202. Further details concerning some example methods and operations according to some embodiments of the invention are discussed below.

D. Example Methods

Figure 3A:
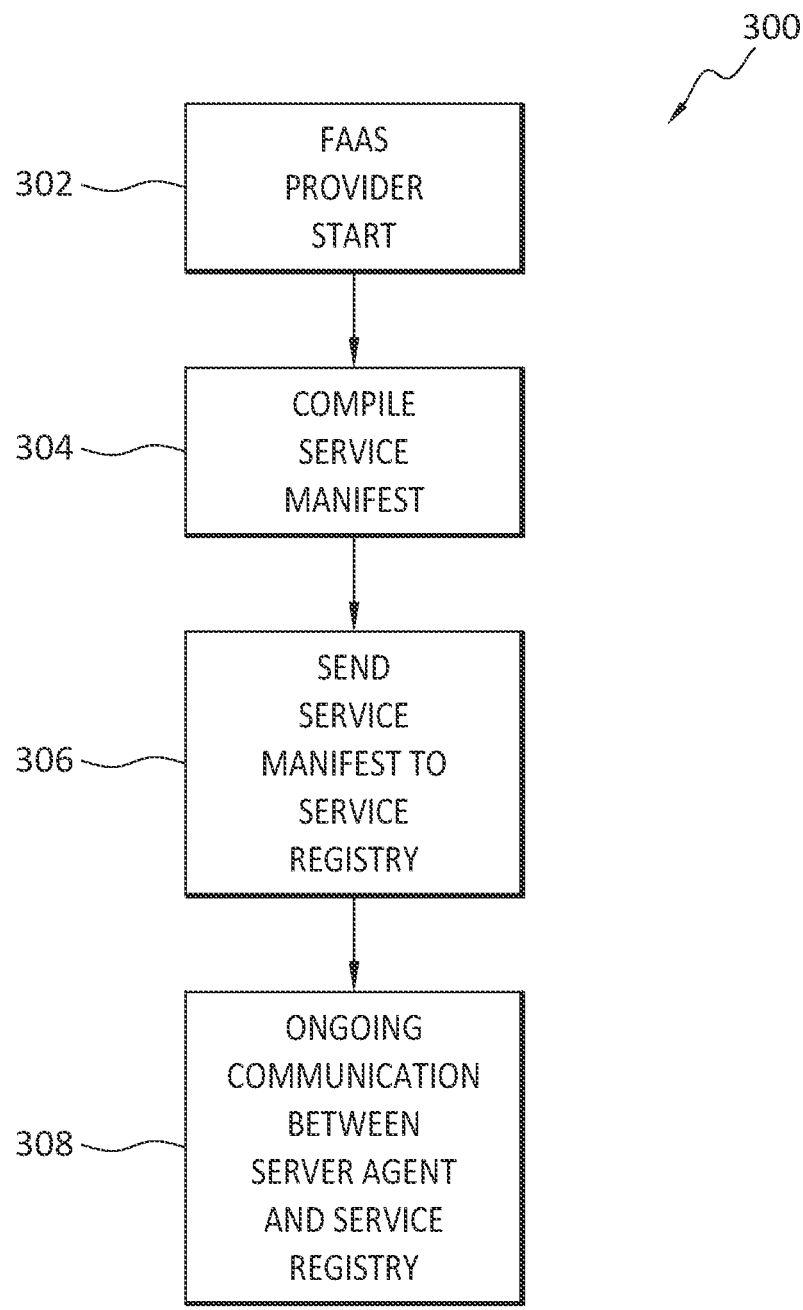
FIG. 3a discloses aspects of an example method for server startup.
Figure 3B:
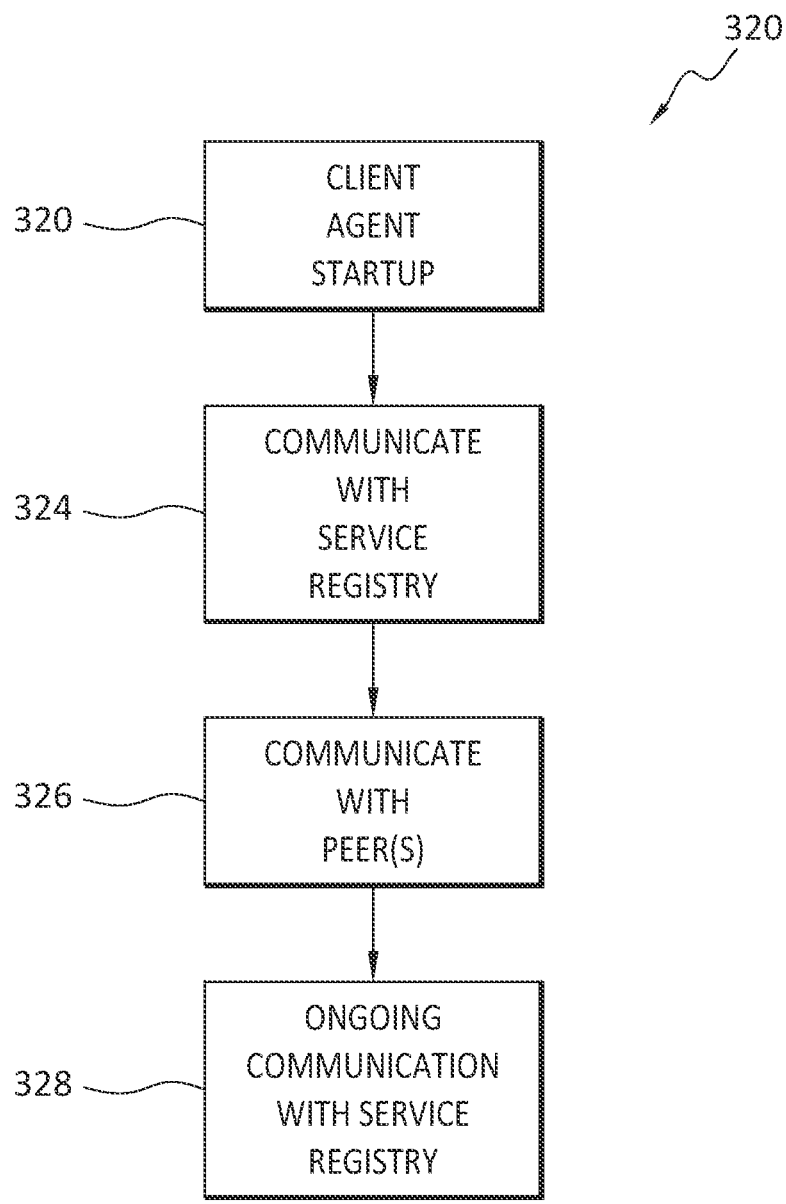
FIG. 3b discloses aspects of an example method for client startup.
Figure 3C:
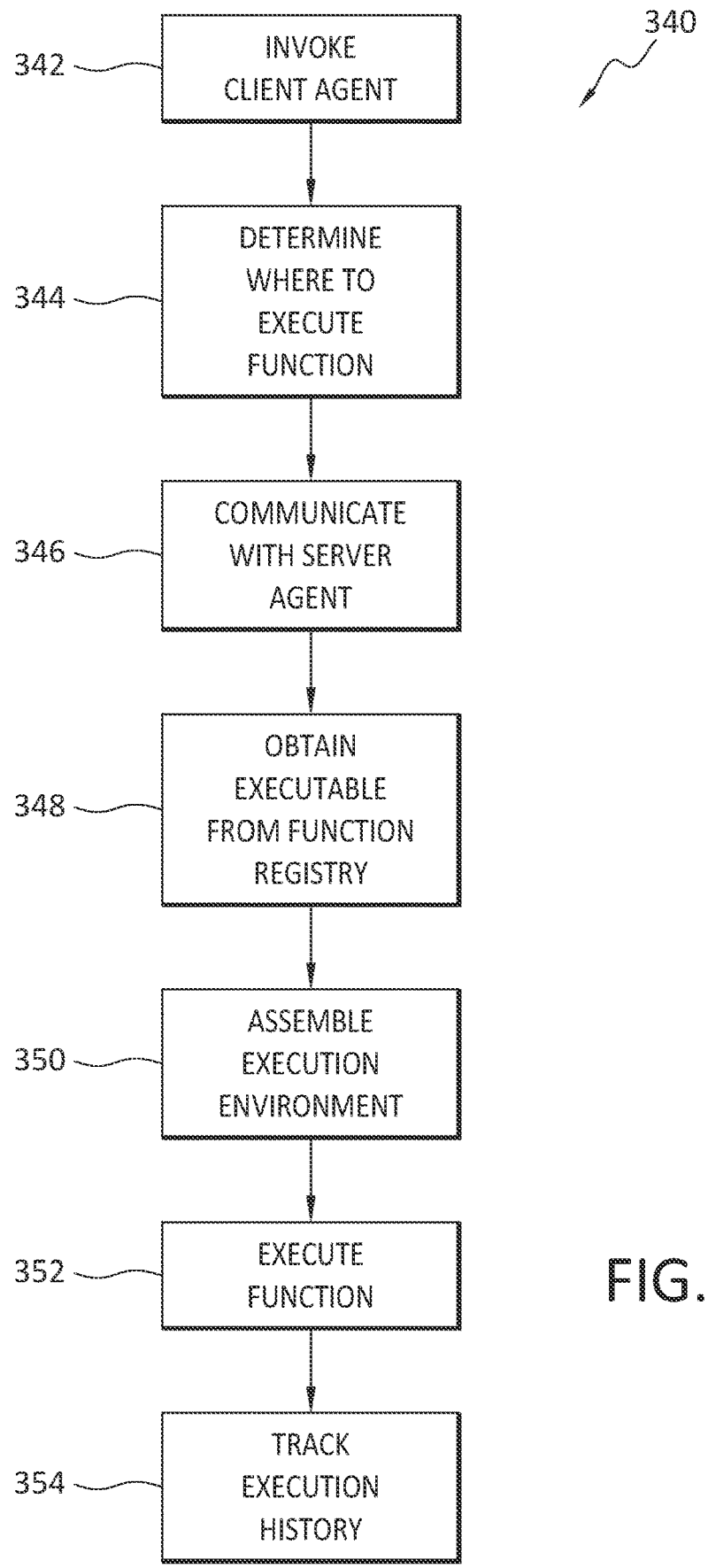
FIG. 3c discloses aspects of an example method for runtime operations.

It is noted with respect to the example method of FIGS. 3a, 3b, and 3c, that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

D.1 Pre-Requisites

Following is a discussion of various methods according to some example embodiments. In some cases, one or more prerequisites may be put in place prior to performance of any one or more of the methods of FIGS. 3a, 3b, and 3c.

Examples of such prerequisites may include, but are not limited to, the following: 1—client agent installed on user equipment or edge-stations; 2—server agent installed on edge-FaaS and cloud-FaaS providers; 3—service registry and function repository are available at the cloud; 4—software vendors have registered their functions at the function repository; 5—the client agent has a default policy including cost and service level expectations—note that users may override default policies and, in some embodiments, the actual cost of each function may be tracked for each user so that, for example, the user may be billed only for the function(s) that they used; and, 6—in some embodiments, there may be UIs for the client agent, server agent, function repository, and/or any management dashboards, and the UI may take the form, for example, of a GUI (Graphical User Interface) or CLI (Command Line Interface).

D.2 Server Start-Up Time

Directing attention now to FIG. 3a, an example method 300 for server start up is disclosed. At the start-up 302 of each cloud-FaaS or edge FaaS provider, the server agent may be initialized. The server agent may then compile 304 the service manifest. In some embodiments, one service manifest per FaaS site may be compiled. The creation of the service manifest may be manual and/or automated and, in the latter case, may comprise auto-discovery of local hardware and software. The service manifest may describe the software and hardware resources available at each FaaS site, as well as the pricing model for the provision of such resources to an application.

Next, the server agent may then send 306 the service manifest to the service registry to indicate that the FaaS provider has the resources available to provide the services. In some embodiments, the server agent may continue to communicate 308 with the service registry periodically provide updates on resource availability at the FaaS provider where the server agent is located. Note that as an alternative, or in addition, to contacting an FaaS provider to determine if the FaaS provider has available resources, the FaaS provider may also be contacted to determine the cost for the FaaS provider to provide the resources, the FaaS provider performance expected to be obtained by use of the resources, and/or, to determine if the FaaS provider is able to comply with any applicable policies.

D.3 Client Start-up Time

Directing attention next to FIG. 3b, an example method 320 for client agent start up is disclosed. Initially, when a user equipment or an edge-station starts up, the client agent may start up 322. Next, the client agent may communicate 324 with a service registry to obtain a list of peers. The client agent may then communicate 326 with each peer to check if the peer has resources available for executing a function of the user equipment or edge station. In some embodiments, the client agent may continue to periodically communicate 328 with a service registry and each peer to obtain updates on peer and resource availability.

D.4 Runtime

Directing attention next to FIG. 3c, an example method 340 for runtime operations is disclosed. The example method 340 may begin when a client agent is invoked 342 by software, running on an edge station or user-equipment, that require functions burst out. In response to the invocation 342, an execution manifest may be sent to the client agent. The execution manifest may be provided by the software providers, and may describe the execution environment expectations.

At 344, a determination may be made as to where to execute the function needed by the software that is running on the edge station or user equipment. This determination 344 may be made based on various factors including, but not limited to, the execution manifest, policies, and peer availability. In some embodiments, different optimization algorithms, such as greedy algorithms or linear algorithms for example, may be used to make the selection of the location where the function will be executed.

After a placement determination 344 has been made, the client agent may communicate 346 with the server agent of the targeted execution environment. As part of this communication 346, the execution manifest may be sent by the client agent to the server agent.

Next, and based on the execution manifest and execution environment, the server agent may obtain 348 the executable (s) from the function registry. The executable may be, for example, binary executables, or container images. In general, the executables may be executed to perform the function that is burst out. A P2P (Peer to Peer) based function registry, such as IPCFS (Intelligent Peer-to peer Container Filesystem) for example, may speed up transmission of the executable to the targeted execution environment. For example, if the execution environment is a Linux based environment, then the Linux version of the executable may be pulled 348.

Possibly in parallel with 348, the server agent may assemble 350 the execution environment based on the execution manifest. Assembly 350 of the execution environment may comprise, for example, reserving hardware, creating containers, and otherwise provisioning an execution environment so as to enable the execution environment to support execution of the executables.

After both the executable and execution environment are ready, the FaaS platform may then execute 352 the function. In some embodiments, the execution history may be tracked 354 for billing purposes. Also, the historical execution data may also impact future function placement decision-making. For example, if another invocation to the same function were to be made in the near-term, then it may be likely that that function could execute faster on the same execution environment due to potential caching of the elements of the execution environment.

E. Further Discussion

As will be apparent from this disclosure, example embodiments of the invention may provide a variety of useful functions and features, one example of which is function-level edge bursting. Particularly, embodiments may enable edge bursting—onto public or private edge-stations—at the function level, as opposed to only at relatively larger, more resource-intensive levels, such as applications or containers for example. As well, the introduction by example embodiments of a service registry makes each service provider available to perform one or more burst out functions. The service manifest and execution manifest provided by example embodiments may also offer a common communication protocol, so that heterogeneous environments and multiple personas can communicate in a complex environment, where such personas may include, for example, edge-FaaS providers, cloud-FaaS providers, software vendors, and function callers.

Another example of useful features and functionalities that may be provided by some example embodiments concerns function caller decision making for function placement and deployment. In conventional approaches, software providers have to deploy their solutions across many different service vendors to realize the benefits of edge performance and cloud cost savings. In contrast, the execution manifest implemented by example embodiments may be provided by software providers, but the actual deployment and placement-decision-making is automated and performed by the function caller, reducing complexity for software vendors, and allowing function callers to adjust cost and performance requirements based on their own policies. As well, some example embodiments may introduce a mechanism supporting heterogeneous execution environments, by pulling executables from a function registry based on the execution environment offered by, for example, cloud-FaaS or edge-FaaS providers. This mechanism may combine the function placement decision made by the function caller, the execution requirements supported by the software providers, and the execution environments offered by each cloud-FaaS and edge-FaaS providers.

Example embodiments of the invention may be extended to a variety of applications such as, for example, global Inference-as-a-Service (INFaaS). Particularly, such embodiments may serve as an underlying innovation of a larger service, such as INFaaS. INFaaS may offers model-less and server-less experience to users and developers, where a ML model is provided, but the INFaaS platform itself is responsible for the transformation of the ML model and inference execution to best fit the user needs, in terms of latency, accuracy, and cost. Such an INFaaS platform may be based on example embodiments, so that the software provider, which may be an ML model provider in this example, and users, may make dynamic decision on where to place ML services. Based on user policies and other considerations disclosed herein, execution of the ML service may be placed at a cloud or edge computing environment.

F. Further Example Embodiments

Following are some further example embodiments of the invention. These are presented only by way of example and are not intended to limit the scope of the invention in any way.

Embodiment 1. A method, comprising the operations: determining that local resources at an edge site are inadequate to support performance of a function needed by software running on the edge site; invoking a client agent; in response to invoking the client agent, receiving an execution manifest; determining, by the client agent, where to execute the function, wherein the determining comprises identifying a target execution environment for the function and the determining is based in part on information contained in the execution manifest; and transmitting, by the client agent, the execution manifest to a server agent of the target execution environment, and the execution manifest facilitates execution of the function in the target execution environment.

Embodiment 2. The method as recited in embodiment 1, wherein the target execution environment and the server agent are located at an FaaS site.

Embodiment 3. The method as recited in any of embodiments 1-2, wherein the execution manifest comprises information concerning resources that are needed to perform the function.

Embodiment 4. The method as recited in any of embodiments 1-3, the operations further comprising referencing, by the client agent, a peer list at a service registry, and contacting one or more peers on the list to determine an availability, and ability, of the peers to perform the function.

Embodiment 5. The method as recited in any of embodiments 1-4, wherein the execution manifest is received from a provider of the software that is running on the edge site.

Embodiment 6. The method as recited in any of embodiments 1-5, wherein the target execution environment includes one or more executables obtained from a function repository.

Embodiment 7. The method as recited in any of embodiments 1-6, wherein the server agent is operable to construct the targeted execution environment for the function.

Embodiment 8. The method as recited in any of embodiments 1-7, wherein a service registry indicates hardware and/or software resources available at one or more sites to execute the function.

Embodiment 9. The method as recited in any of embodiments 1-8, wherein the client agent is invoked by the software.

Embodiment 10. The method as recited in any of embodiments 1-9, wherein the client agent runs on the edge site.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
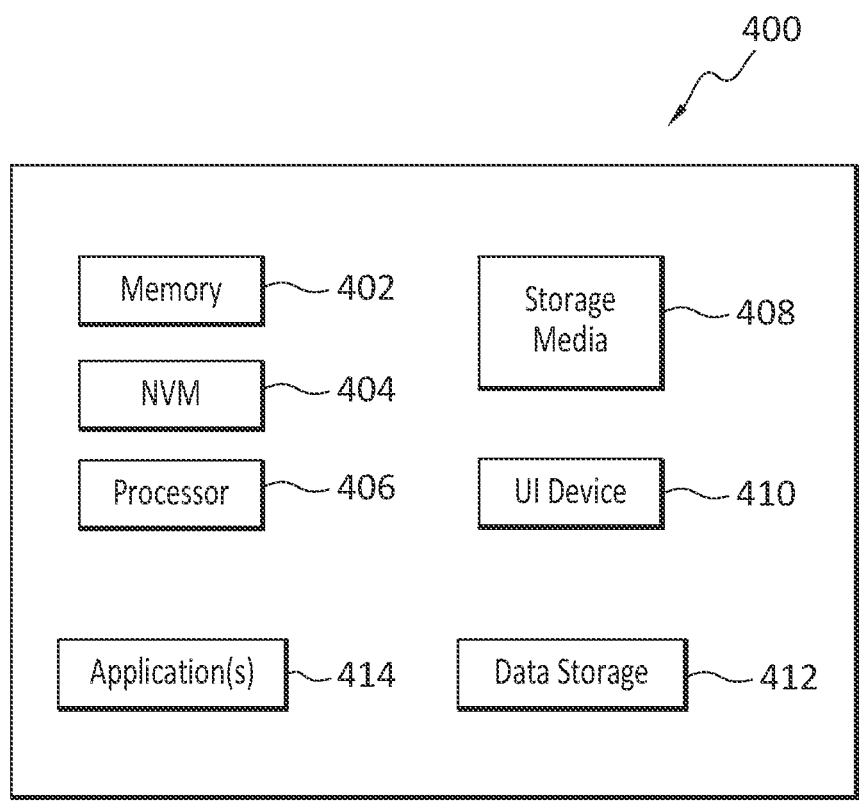
FIG. 4 discloses aspects of an example computing entity operable to perform any of the claimed methods, processes, and operations.

With reference briefly now to FIG. 4, any one or more of the entities disclosed, or implied, by FIGS. 1-3c and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing, in an edge computing environment that includes a group of edge sites, operations comprising:
determining, at a particular one of the edge sites, that local resources at the particular edge site are inadequate to support performance of a function needed by software running on the particular edge site;
invoking, by the particular edge site, a client agent in the particular edge site;
receiving and referencing, by the client agent, a list of target execution environments from a service registry in a cloud environment, wherein each of the target execution environments sends a respective service manifest to the cloud environment;
contacting, by the client agent, one or more target execution environments in the list based on service manifests to perform the function, wherein a respective service manifest of each target environment lists hardware and software resources available at that target environment;
determining, by the client agent, where to execute the function, wherein the determining comprises identifying a particular target execution environment in the list, external to the edge computing environment and configured to communicate with the edge sites, for the function based in part on a service manifest of the particular target execution environment and information contained in an execution manifest corresponding to the function to be burst out;
transmitting as part of a function call, by the client agent, the execution manifest to a server agent of the target execution environment;
obtaining, by the server agent, an executable from the function registry of the cloud environment; and
assembling, by the server agent, an execution environment of the particular target execution environment based on the execution manifest to perform the function by executing the executable,
wherein the execution manifest facilitates execution of the function in the target execution environment.

2. The method as recited in claim 1, wherein the particular target execution environment and the server agent are located at an FaaS site.

3. The method as recited in claim 1, wherein the execution manifest comprises information concerning resources that are needed to perform the function.

4. The method as recited in claim 1, wherein the execution manifest is received from a provider of the software that is running on the edge site.

5. The method as recited in claim 1, wherein the particular target execution environment includes one or more executables obtained from a function repository of the cloud environment.

6. The method as recited in claim 1, wherein the server agent is operable to construct the targeted execution environment for the function.

7. The method as recited in claim 1, wherein the service registry indicates hardware and/or software resources available at one or more sites to execute the function.

8. The method as recited in claim 1, wherein the client agent is invoked by the software.

9. The method as recited in claim 1, wherein the client agent is operable to adjust cost and performance requirements associated with the function call.

10. A non-transitory computer readable storage medium having stored therein instructions that are executable by one or more hardware processors to perform operations comprising:
- determining that local resources at an edge site are inadequate to support performance of a function needed by software running on the edge site;
- invoking, by the edge site, a client agent in the edge site;
- receiving and referencing, by the client agent, a list of target execution environments from a service registry in a cloud environment, wherein each of the target execution environments sends a respective service manifest to the cloud environment;
- contacting, by the client agent, one or more target execution environments in the list based on service manifests to perform the function, wherein a respective service manifest of each target environment lists hardware and software resources available at that target environment;
- determining, by the client agent, where to execute the function, wherein the determining comprises identifying a particular target execution environment in the list for the function based in part on a service manifest of the particular target execution environment and information contained in an execution manifest corresponding to the function to be burst out;
- transmitting, by the client agent, the execution manifest to a server agent of the target execution environment;
- obtaining, by the server agent, an executable from the function registry of the cloud environment; and
- assembling, by the server agent, an execution environment of the particular target execution environment based on the execution manifest to perform the function by executing the executable,
- wherein the execution manifest facilitates execution of the function in the target execution environment.

11. The non-transitory computer readable storage medium as recited in claim 10, wherein the particular target execution environment and the server agent are located at an FaaS site.

12. The non-transitory computer readable storage medium as recited in claim 10, wherein the execution manifest comprises information concerning resources that are needed to perform the function.

13. The non-transitory computer readable storage medium as recited in claim 10, wherein the execution manifest is received from a provider of the software that is running on the edge site.

14. The non-transitory computer readable storage medium as recited in claim 10, wherein the particular target execution environment includes one or more executables obtained from a function repository of the cloud environment.

15. The non-transitory computer readable storage medium as recited in claim 10, wherein the server agent is operable to construct the targeted execution environment for the function.

16. The non-transitory computer readable storage medium as recited in claim 10, wherein the service registry indicates hardware and/or software resources available at one or more sites to execute the function.

17. The non-transitory computer readable storage medium as recited in claim 10, wherein the client agent is invoked by the software.

18. The non-transitory computer readable storage medium as recited in claim 10, wherein the client agent runs on the edge site.

* * * * *